United States Patent
Miranda et al.

(10) Patent No.: US 9,358,537 B1
(45) Date of Patent: Jun. 7, 2016

(54) STYRENE BASED ION EXCHANGE RESINS WITH OXINE FUNCTIONALIZED GROUPS

(71) Applicants: Paul J. Miranda, Butte, MT (US); Corby G. Anderson, Golden, CO (US); Edward Rosenberg, Missoula, MT (US)

(72) Inventors: Paul J. Miranda, Butte, MT (US); Corby G. Anderson, Golden, CO (US); Edward Rosenberg, Missoula, MT (US)

(73) Assignee: Montana Tech of the University of Montana, Butte, MT (US)

( * ) Notice: Subject to any disclaimer, the term of this patent is extended or adjusted under 35 U.S.C. 154(b) by 0 days.

(21) Appl. No.: 14/027,552

(22) Filed: Sep. 16, 2013

Related U.S. Application Data

(63) Continuation of application No. 12/693,367, filed on Jan. 25, 2010, now Pat. No. 8,535,528.

(60) Provisional application No. 61/147,025, filed on Jan. 23, 2009.

(51) Int. Cl.
*B01D 15/08* (2006.01)
*B01J 41/14* (2006.01)
*C22B 3/42* (2006.01)

(52) U.S. Cl.
CPC ... *B01J 41/14* (2013.01); *C22B 3/42* (2013.01)

(58) Field of Classification Search
USPC .............................. 210/198.2, 502.1, 635, 656
See application file for complete search history.

(56) References Cited

U.S. PATENT DOCUMENTS

| | | | | |
|---|---|---|---|---|
| 4,112,044 | A * | 9/1978 | Miyake | B01D 59/30 423/6 |
| 4,222,892 | A * | 9/1980 | Motojima et al. | 502/401 |
| 4,659,512 | A * | 4/1987 | Macedo et al. | 588/11 |
| 4,876,232 | A * | 10/1989 | Barkatt | 502/417 |
| 5,069,942 | A * | 12/1991 | Anderson | 427/387 |
| 6,758,967 | B1 * | 7/2004 | Anderson et al. | 210/198.2 |
| 8,535,528 | B1 * | 9/2013 | Miranda | B01J 39/185 210/198.2 |

* cited by examiner

*Primary Examiner* — Peter D Mulcahy
*Assistant Examiner* — Henry Hu
(74) *Attorney, Agent, or Firm* — Jean Kyle

(57) ABSTRACT

Oxine ligands placed on styrene base ion exchange resins selectively remove iron and gallium from acidic solutions. After loading, the oxine resin is stripped of the loaded metals and used again for further metal removal. The resins can be used for process streams, acid rock drainages, or any other iron or gallium containing solution.

3 Claims, 3 Drawing Sheets

STYRENE BASED ION EXCHANGE RESINS WITH OXINE FUNCTIONALIZED GROUPS

CROSS-REFERENCE TO RELATED APPLICATIONS

This application is a continuation of co-pending U.S. patent application Ser. No. 12/693,367, filed Jan. 25, 2010, which claims the benefits of U.S. Provisional Application No. 61/147,025, filed Jan. 23, 2009, the disclosure of which is hereby incorporated by reference in its entirety including all figures, tables and drawings.

STATEMENT REGARDING FEDERALLY SPONSORED RESEARCH OR DEVELOPMENT

This invention was made with Government support under Grant No. CR-19476 A 429231 awarded by the Center for Advanced Separation Technologies. The Government has certain rights in the invention.

REFERENCE TO SEQUENCE LISTING, A TABLE, OR A COMPUTER PROGRAM LISTING COMPACT DISC APPENDIX

Not applicable

BACKGROUND OF THE INVENTION

Many mining companies utilize acid based leaching techniques for copper and other potential metals. During this process, unwanted metals, such as iron, leach into solution, therefore, further processing must be employed for iron removal or selective separation of valuable metals. These techniques include solvent extraction, precipitation, and/or ion exchange methods.

Current technologies used for ferric iron removal, such as precipitation techniques, produce large amounts of iron containing sludge and require large amounts of chemicals. For solvent extraction techniques, the raffinate, a liquid steam that remains after the extraction with the immiscible liquid to remove solutes from the original liquor, can easily become contaminated with iron and lower overall removal efficiency. Other ion exchange resins from removal of iron from solutions have been successfully created, however, these technologies utilize phosphonate ligands and have low overall capacities.

BRIEF SUMMARY OF THE INVENTION

The invention involves the selective removal of certain metals from aqueous systems using a selective ligand ion exchange resin. In a particularly preferred embodiment, iron, as ferric, or gallium is selectively removed from other metals, such as copper, cobalt, and nickel, in acidic solutions by a styrene resin with oxine functionalized groups. After metal loading of the resin, the resin is stripped to concentrate the either ferric iron or gallium from the initial solution for further treatment. The stripped resin can be used again over many cycles for further selective removal of iron or gallium from solution. The invention can be easily applied to contaminated streams, process streams, acid rock drainages, or other potential iron or gallium containing solutions.

DETAILED DESCRIPTION OF THE INVENTION

The invention involves a styrene based ion exchange resin with oxine functionalized groups that selectively remove certain metals from mixed metal solutions.

Although iron and gallium have the highest affinity for the functionalized oxine ligands of the ion exchange resin of the subject invention, the subject resin can be used to remove other metals, including but not limited to, copper, cobalt, rhodium, zinc, cerium, lanthanum, germanium, nickel, platinum, palladium, uranium, antimony, cadmium, indium and molybdenum, from mixed metal solutions. Oxine based ligands are used in solvent extraction techniques to remove metals from mine leach solutions. These oxine ligand solvent extraction techniques however suffer from the deficiencies of other solvent extraction techniques. The subject method provides an effective and efficient means to remove unwanted metals from an aqueous solution. Oxine base ligands are functionally chemically attached to a styrene base to provide a selective ligand ion exchange resin.

Figure 1:
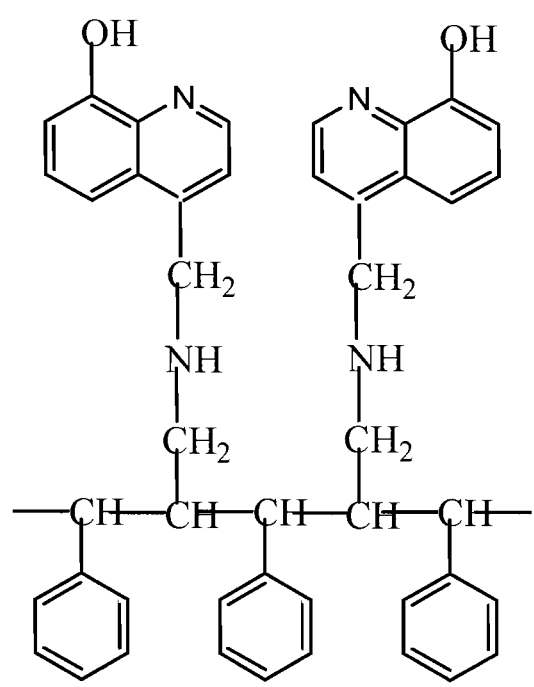
FIG. 1 is a diagram of a preferred embodiment of an oxine ligand styrene based ion exchange resin of the subject invention.

A preferred embodiment of the subject resin is shown in FIG. 1 and can be prepared by the following method:
1) A styrene based amine ligand ion exchange (IX) resin is used (either primary amine or secondary amine).
2) For initial reaction, each gram of IX resin is reacted and mixed with 1 milliliter of formaldehyde and 0.1 milliliter acetic acid for 24 hours.
3) The solid liquid mixture is then filtered with the IX resin remaining.
4) The IX resin is then reacted with 4 times the amount of methanol in milliliters and dissolved 8-hydroxyquinoline (1×) adjusted to pH=9 with ammonium hydroxide.
5) The solid liquid mixture is refluxed at 70 degrees centigrade for 24 hours.
6) The solid liquid mixture is filtered off and the reacted ion exchange resin is rinsed with dilute ammonium hydroxide, then distilled water, then dilute acetic acid, and distilled water.

Figure 2:
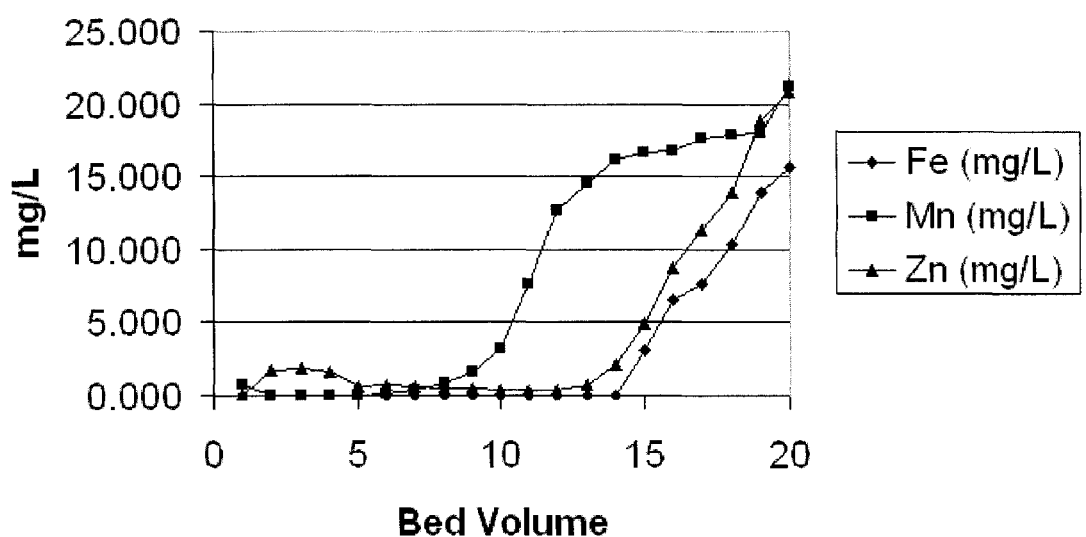
FIG. 2 is a graph showing the selective removal of Fe from an aqueous solution by a preferred embodiment of the resin of the subject invention.
Figure 3:
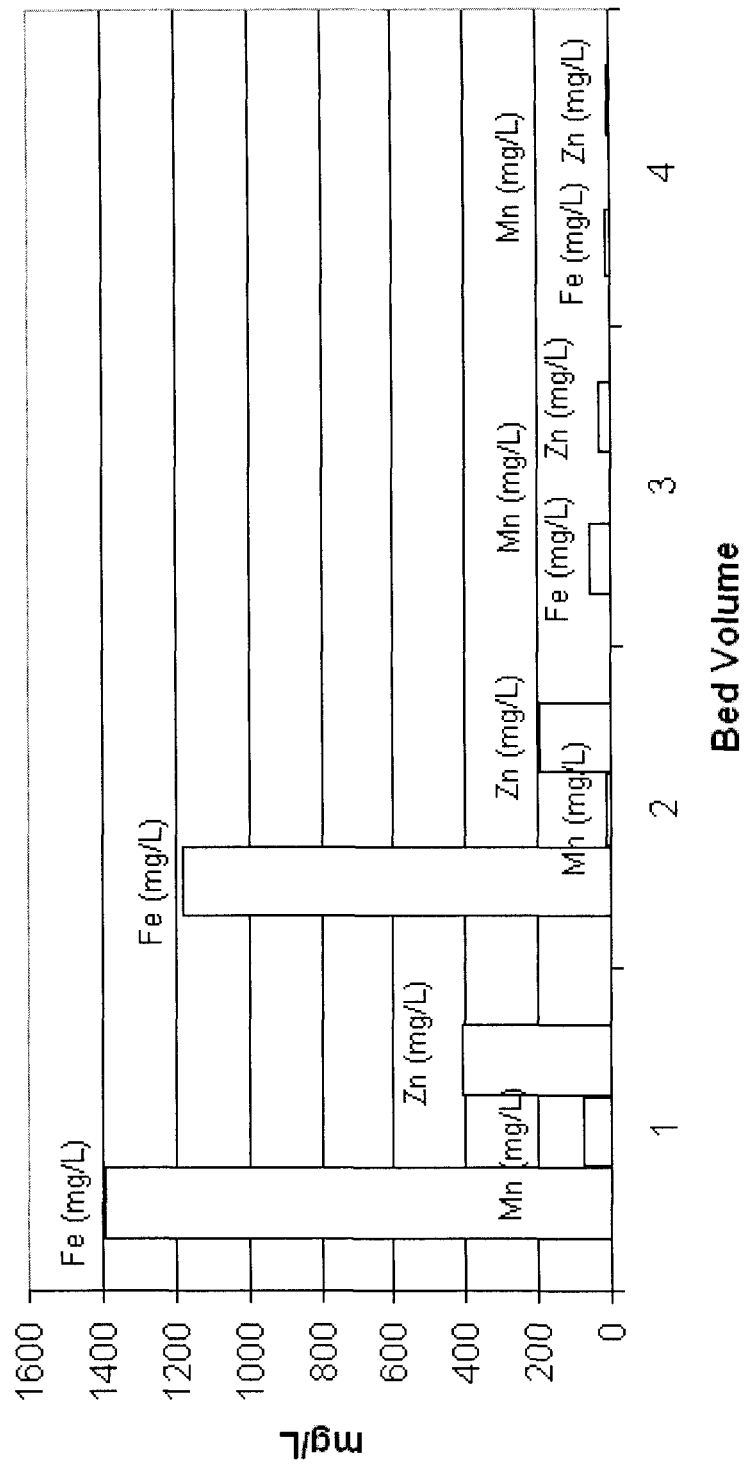
FIG. 3 is a graph showing the removed Fe being stripped from the preferred embodiment of the resin in FIG. 2.

Laboratory column testing has been completed on solutions containing iron, manganese, and zinc for selective iron removal. Flow rate for testing was done at 0.20 bed volumes per minute and samples taken every bed volume. (FIG. 2) After testing, the sample was successfully stripped with sulfuric acid and analyzed for iron, manganese, and zinc (FIG. 3).

It is understood that the foregoing examples are merely illustrative of the present invention. Certain modifications of the articles and/or methods may be made and still achieve the objectives of the invention. Such modifications are contemplated as within the scope of the claimed invention.

The invention claimed is:
1. A method making a selective ligand ion exchange resin comprising the steps of:
providing a styrene based amine ligand ion exchange resin, the amine containing group connected to the styrene based ion exchange resin by a first linking organic group; and
executing the Mannich reaction to attach an 8-hydroxyquinoline ligand to said styrene based amine ion exchange resin through a second linking organic group.

2. The method of claim 1, wherein said amine containing group is a primary amine.

3. The method of claim 1, wherein said amine containing group is a secondary amine.

* * * * *